C. W. HOTTMANN.
CUTTING AND MIXING MACHINE.
APPLICATION FILED JUNE 12, 1919.
1,314,962.
Patented Sept. 2, 1919.
2 SHEETS—SHEET 1.
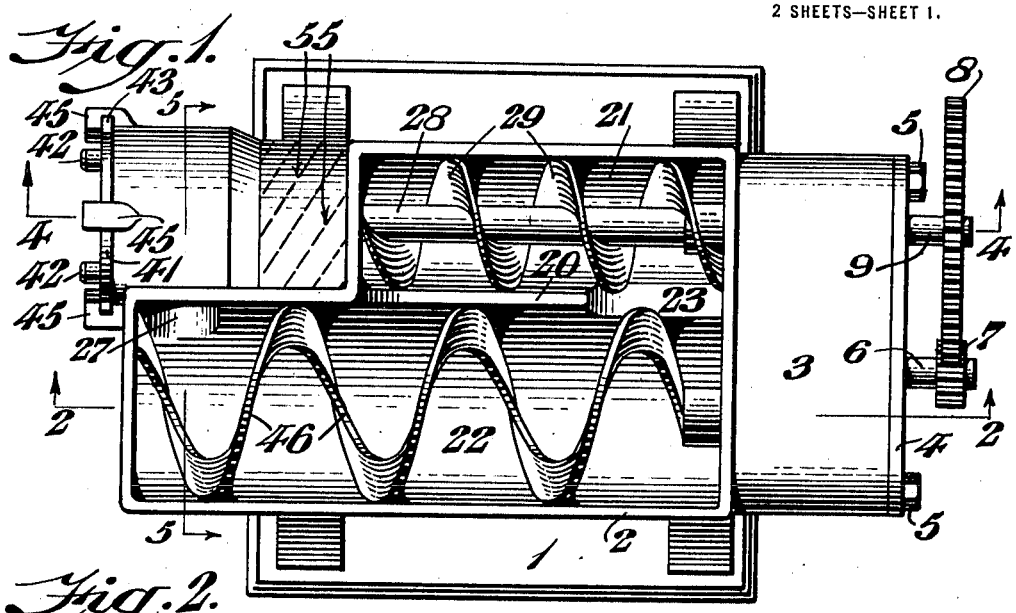
INVENTOR
Charles W. Hottmann
BY
Wiederslein & Fairbanks
ATTORNEYS.

C. W. HOTTMANN.
CUTTING AND MIXING MACHINE.
APPLICATION FILED JUNE 12, 1919.
1,314,962.
Patented Sept. 2, 1919.
2 SHEETS—SHEET 2.
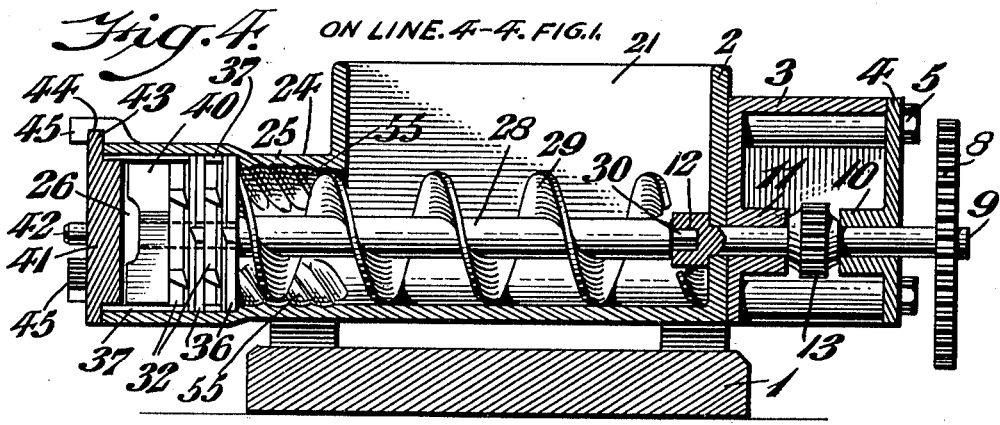
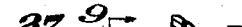
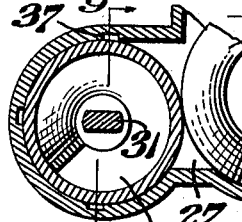
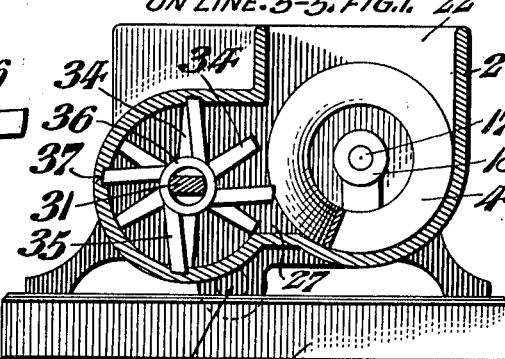
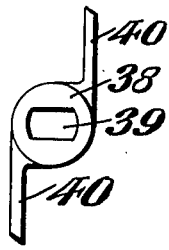
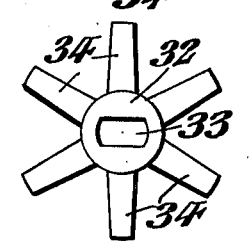
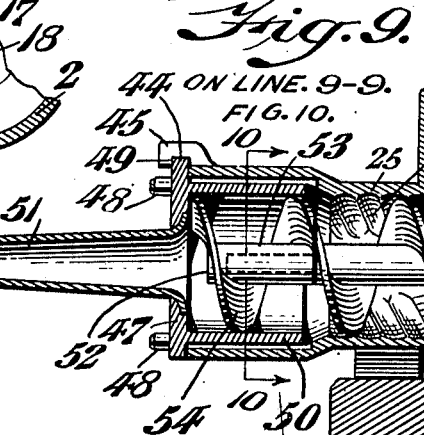
INVENTOR
Charles W. Hottmann
BY
Wiedersheim & Fairbanks
ATTORNEYS.

UNITED STATES PATENT OFFICE.

CHARLES W. HOTTMANN, OF PHILADELPHIA, PENNSYLVANIA.

CUTTING AND MIXING MACHINE.

1,314,962.  Specification of Letters Patent.  Patented Sept. 2, 1919.

Application filed June 12, 1919. Serial No. 303,746.

*To all whom it may concern:*

Be it known that I, CHARLES W. HOTT-MANN, a citizen of the United States, residing in the city and county of Philadelphia, State of Pennsylvania, have invented a new and useful Cutting and Mixing Machine, of which the following is a specification.

In my prior Patent No. 1,017,213, dated Feb. 13, 1912, and my prior Patent No. 1,237,907, dated Aug. 21, 1917, I have described and broadly claimed novel constructions of cutting and mixing machines wherein the cutting of the material is effected by means of a draw cut. Machines of this type have been found in practice to give very advantageous results. In many cases, however, a machine constructed in accordance with my present invention is preferable, since the material is acted upon by cutting mechanism which performs a shear cut instead of a draw cut and the underlying principle of my present invention is entirely different from that of my prior patents.

With the above in view, my present invention in its broad and generic scope comprises a novel construction and arrangement of a cutting and mixing machine wherein the material to be acted upon is automatically fed under pressure to the cutting mechanism which is mounted on a feed shaft, and the material is passed into a return feed channel by feed members carried by the first feed shaft, the construction being such that the material in the return feed channel is automatically passed into the feed channel leading to the cutters.

My invention further comprehends a novel machine of the type described wherein a slow return feed of the material is obtained.

It further consists of a novel construction and arrangement of a casing, a novel construction of cutting mechanism, a novel construction and arrangement of feeding mechanism for the material, a novel construction and arrangement of driving mechanism, and novel means for effecting the discharge of the material from the machine in such a manner that it will be automatically fed and packed into the bags, casings or containers which are to be filled with the material which has been cut.

Other novel features of construction and advantage will more clearly hereinafter appear in the detailed description of the invention.

For the purpose of illustrating my invention, I have shown in the accompanying drawings a typical embodiment of it which, in practice, will give satisfactory and reliable results. It is, however, to be understood that this embodiment is typical only, and that the various instrumentalities of which my invention consists can be variously arranged and organized, and that the invention is not limited to the precise arrangement and organization of these instrumentalities as herein set forth.

Figure 1 represents a top plan view of a cutting and mixing machine, embodying my invention.

Fig. 2 represents a section on line 2—2 Fig. 1.

Fig. 3 represents an end view with certain parts removed in order to illustrate more clearly certain features of the driving mechanism.

Fig. 4 represents a section on line 4—4 of Fig. 1.

Fig. 5 represents a section on line 5—5 of Fig. 1.

Fig. 6 represents a plan view of the stationary cutting member.

Fig. 7 represents a plan view of a revolving cutting member.

Fig. 8 represents a plan view of a feed member to cause the material which has been cut to be fed from the cutting chamber into the return feed channel.

Fig. 9 represents a section on line 9—9 of Fig. 10.

Fig. 10 represents a section on line 10—10 of Fig. 9.

Similar numerals of reference indicate corresponding parts.

Referring to the drawings.

1 designates a base or foundation of any desired construction, for example, the floor of the building, which supports the casing 2 of the cutting and mixing machine, which is preferably open at its top in order to facilitate the placing of the material which is to be mixed and cut into the machine. The casing 2 has connected to it in any desired manner a gear casing 3, which is provided with a removable side 4, connected to it by means of fastening devices 5 of any desired character. The gear casing 3 has suitably journaled in it the main driving shaft 6 which is adapted to be driven in any desired manner, but preferably by means of an electric motor, not shown, which would be intergeared with the gear 7 on the main driving shaft 6. The gear 7 meshes with a gear 8 mounted on a shaft 9 which is journaled in the hub 10 of the side plate 4, and the hub 11 of the gear casing 3 and its rear end extends into the casing 2 and is provided with an enlargement having a polygonal shaped aperture 12. The shaft 9 has fixed to it a gear 13 which meshes with an idler 14 mounted on a stud shaft 15, and the idler 14 meshes with a gear 16 mounted on a shaft 17 journaled in the gear casing 3 and having its forward end extending into the casing 2.

Fixed to the shaft 17, and within the casing 2, is an arm 18 having a slot 19 at its free end. The casing 2 is provided with a central partition 20 forming the feed channels 21 and 22, the bottoms of which are semi-cylindric in contour. The partition 20 at one end terminates a desired distance from the wall of the casing to form a port 23 which is in communication with the feed channels 21 and 22. The feed channel 22, which is the return feed channel, has its upper portion preferably open throughout its length and the rear portion of the feed channel 21, which is the forward feed channel, is preferably open. The forward end of the feed channel 21, however, is closed by means of the casing portion 24 so that a pressure chamber 25 is formed through which the material is fed to the cutting mechanism which is located in the chamber 26 and which communicates with the return feed channel 22 by means of a port 27. The feed channel 21 has mounted in it a conveyer or feed shaft 28 which is provided with a spiral feed blade 29, one end of the shaft 28 having a polygonal contour, as at 30, in order to adapt it to fit in the polygonal shaped recess of the shaft 9. The opposite end of the shaft 28 has a polygonal shaped contour as indicated at 31, see more particularly Figs. 5 and 10.

32 designates a cutting member the hub of which is provided with a polygonal shaped aperture 33 in order to adapt it to fit on the polygonal shaped end 31 of the conveyer shaft 28. The cutting member 32 is provided with a desired number of cutting blades 34 which coöperate with the stationary cutting blades 35 carried by a hub 36 which is loosely mounted on the conveyer or feed shaft 28. The wall of the cutting chamber 26 is provided with the longitudinally extending slots 37 corresponding in number to the number of the stationary blades 35, the ends of which they receive in order to prevent rotation of the stationary cutting blade, as will be best understood by reference to Fig. 4.

38 designates a feed member the hub of which is provided with a polygonal shaped aperture 39 in order to adapt it to fit on the feed shaft 28 so that it will rotate in unison with it, and this feed member is provided with off-set blades or paddles 40 which cause the material which has been cut to pass from the chamber 26 through the port 27 into the return feed channel 22. The cutting chamber 26 is provided with a closure 41 having a handle 42 and provided with peripheral lugs 43 which engage the apertures 44 of the lugs 45 which are connected to the casing 2, and preferably form an integral part of it.

46 designates a hollow, spiral feed conveyer, one end of which extends into the aperture 19 so that it will revolve in unison with the revolution of the shaft 17.

In order to construct the machine in such a manner that after the material has been cut to the proper degree of fineness it can be discharged into a desired container, I provide a closure 47 having handles 48 for operating it, and provided with lugs 49 which seat in the apertures 44 of the lugs 45. The closure 47 is provided with an annular flange 50 which extends into the cutting chamber 26, and it is also provided with a discharge spout 51 having any desired contour. 52 designates a short shaft having a polygonal shaped aperture 53 which extends into it in order to adapt it to engage the polygonally shaped end 31 of the feed shaft 28. The shaft 52 carries a spiral feed member 54 the rear end of which forms a continuation of the forward end of the spiral feed member 29.

The operation of my novel cutting and mixing machine will now be readily apparent to those skilled in the art to which this invention appertains and is as follows:

The construction and arrangement of the driving mechanism is such that the spiral feed member 29 revolves at a much higher speed than the speed of revolution of the feed member 46. If, for example, the feed member 29 is revolved at a speed of 150 revolutions per minute, the feed member 46 would preferably revolve at a speed of about 40 revolutions per minute, it being of course understood that the relative speed of rotation of these two feed members can be varied in accordance with the conditions and requirements met with in practice.

Assuming now that the driving shaft 6 is being driven by means of any desired source of power, it will be apparent that the feed member in the feed channel 21 together with the cutting member 32 and feed member 38 will be revolved at a comparatively high speed. At the same time, the feed member 46 will be revolved in a reverse direction to the direction of rotation of the feed member 29 so that while the feed member 29 feeds the material forwardly, the feed member 46 is feeding the material rearwardly with respect to the cutting chamber 26.

The material which is to be cut and mixed is placed in the casing 2 and preferably in the feed chamber 22. The construction of the feed member 46 is such that the material will pass through port 23 into the feed channel 21 and as soon as it passes into the compression chamber 25 it will be forced forwardly through the openings in the cutting members, and the rapidly revolving cutter 32 coöperating with the stationary cutter 36 will cut the material with a shear cut in a manner similar to that obtained by a pair of scissors. The material passes through the cutting members and since the feed member 38 revolves in unison with the feed shaft 28, it will feed the cut material from the cutting chamber 26 into the mixing channel or chamber 22, and the material is fed rearwardly by the feed member 46, as is apparent.

As before explained, any desired seasoning or other material may be added to the material, preferably by placing it in the feed chamber 22 so that all of the material will be thoroughly mixed.

As soon as the material has been reduced to the desired degree of fineness, the closure 41 is removed and also the feed member 38, stationary cutting member 36 and the rotatable cutting member 32. The shaft 52 is then fitted on the end of the feed shaft 28 and the closure 47 secured in position as will be understood by reference to Fig. 9. The saussage casings, bags or other containers, depending upon the character of the material, are then brought into proper relation with respect to the spout 51 and the material in the feed casing 2 will be discharged through the spout 54 into the containers when the machine is now operated.

A machine constructed in accordance with my present invention is adapted to cut a great variety of material which cannot be satisfactorily operated upon in machines such as disclosed in my prior patents, to which I have hereinbefore referred.

It will be apparent that a machine constructed in accordance with my present invention may be readily maintained in a sanitary condition, since the feed shaft 28 and the cutting mechanism may be withdrawn through the cutting chamber as soon as the closure 41 has been removed. The shaft 46 may also be readily disengaged from its driving arm 18 by turning it at a slight angle and removing the free end of the shaft from the slot 19 in such arm 18.

It will be further apparent that as soon as the closure 41 is removed the cutting mechanism may be quickly removed without disturbing any other part of the machine. The compression chamber 25 is of such length that the action of the spiral feed screw, such as 29, will place sufficient compression on the material to force it through the openings between the knives of the stationary and rotatable cutting members.

I preferably provide the upper and the lower wall of the cutting chamber 26 with grooves or corrugations 55 which are inclined with respect to the longitudinal axis of the cutting chamber 26, the side walls being round or curved. These grooves are preferably in the form of spirally disposed channels presented in a direction reverse to the direction of rotation of the feed screw 29, and their function is to tend to retard the rotation of the material being fed and prevent the bodily rotation of the mass of material as it is fed forwardly under pressure to the cutting knives.

In my present invention the cutting mechanism is directly actuated by one of the feed screws. Any desired or conventional construction of cutting members may be employed.

It will now be apparent that I have devised a novel and useful construction of a cutting and mixing machine which embodies the features of advantage enumerated as desirable in the statement of the invention and the above description, and while I have, in the present instance, shown and described a preferred embodiment of it which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a device of the character described, the combination of a casing having feed channels intercommunicating at their rear ends, one of said feed channels terminating at its forward end in a cutting chamber having an opening leading to the other feed channel, a feed conveyer in each of said feed channels, cutting mechanism actuated by one of said conveyers, and means for actuating said feed conveyers.

2. In a device of the character described, the combination of a casing having feed channels intercommunicating at their rear ends, one of said feed channels terminating at its forward end in a cutting chamber having an opening leading to the other feed channel, a feed conveyer in each of said feed channels, cutting mechanism actuated by one of said conveyers, and means for actuating said feed conveyers to cause the feed conveyer carrying the cutting mechanism to revolve at a higher speed than the speed of revolution of the other feed conveyer.

3. In a device of the character described, the combination of a casing having feed channels intercommunicating at their rear ends, one of said feed channels terminating at its forward end in a cutting chamber having an opening leading to the other feed channel, cutting mechanism in said cutting chamber, a feed conveyer in one feed channel and operatively connected with said cutting mechanism to actuate it, means actuated by said feed conveyer to feed the material from said cutting chamber through said opening into the second feed channel, a feed conveyer in said second feed channel to feed the material rearwardly and pass it into the rear end of said first feed channel, and actuating means for said conveyers.

4. In a device of the character described, the combination with a casing having feed channels, one of which terminates at its forward end in a cutting chamber having a port through its side wall communicating with the other feed channel, said feed channels communicating with each other at their rear end, cutting mechanism in said cutting chamber, a feed conveyer in one of said channels to feed the material to said cutting mechanism and operatively connected with said cutting mechanism to actuate it, a feed conveyer in the other of said channels to feed the material rearwardly and pass it into the other channel, and actuating means for said conveyers.

5. In a device of the character described, the combination with a casing having feed channels, one of which terminates at its forward end in a cutting chamber having a port through its side wall communicating with the other feed channel, said feed channels communicating with each other at their rear end, cutting mechanism in said cutting chamber, a feed conveyer in one of said channels to feed the material to said cutting mechanism and operatively connected with said cutting mechanism to actuate it, a hollow spiral feed conveyer in the other of said channels to feed the material rearwardly and pass it into the other channel, and actuating means for said conveyers.

6. In a device of the character described, the combination of a casing having feed channels located side by side and communicating with each other at their rear end, the forward end of one feed channel terminating in a cutting chamber having a port in its side wall communicating with the other feed channel, a feed conveyer in each of said channels, cutting mechanism actuated by one of said feed conveyers, and means actuated by one of said feed conveyers to pass the material from the cutting chamber into the juxtaposed feed channel.

7. In a device of the character described, the combination of a casing having feed channels disposed side by side and communicating with each other at their rear ends, one of said feed channels terminating in a chamber communicating by a port with the other feed channel, a feed member in said chamber having means to connect it to the juxtaposed feed conveyer, and a removable closure for said chamber and provided with a discharge opening.

8. In a device of the character described, the combination of a casing having feed channels communicating with each other at their rear ends, one of said feed channels terminating in a chamber, a feed conveyer in each feed channel, a feed member in said chamber forming a continuation of the juxtaposed feed conveyer, a closure for said chamber having a discharge spout, and actuating means for said conveyer.

9. In a device of the character described, the combination with a casing having feed channels communicating with each other at their rear ends, one of said channels terminating in a cutting chamber and formed in proximity to said cutting chamber by a closed wall forming a compression chamber, a feed screw in a feed channel and extending into the compression chamber, cutting mechanism actuated by said feed screw, a feed screw in the other of said feed channels, and actuating means for said feed screw.

10. In a device of the character described, a casing having a partition contributing to form feed channels communicating with each other at their rear ends, one of said feed channels terminating in a cutting chamber having an opening communicating with the other feed channel, stationary knives in said cutting chamber, a feed conveyer in one of said channels havings its end extending into the cutting chamber, cutting knives fixed to such end, means actuated by said feed conveyer to move the material from said cutting chamber through said opening into the other feed channel, means in such other feed channel to feed the material rearwardly from the cutting chamber and pass it into the other feed channel, and actuating means for said feed conveyer and said means.

11. In a device of the character described, the combination of a casing having feed channels communicating with each other at their rear ends, one of said feed channels terminating in a cutting chamber having a port communicating with the other feed channel, driving mechanism including intergeared shafts extending into said feed channel, feed conveyers having their ends detachably connected with said shaft, and cutting mechanism in said cutting chamber actuated by one of said feed shafts.

12. In a device of the character described, the combination of a casing having feed channels intercommunicating at their rear ends, one of said feed channels terminating in a cutting chamber having an opening communicating with the other feed channel, a feed conveyer in each channel, actuating means for the feed conveyer, and cutting mechanism in said cutting chamber and actuated by one of said feed conveyers to produce a shear cut on the material fed to the cutting chamber.

13. In a device of the character described, the combination of a casing having feed channels intercommunicating at their rear ends, one of said feed channels terminating in a cutting chamber having an opening through its side wall communicating with the other feed channel and having a second opening, a closure for said second opening, feed conveyers in said channels operatively connected to be driven in opposite directions, actuating means for said feed conveyers, one of said feed conveyers extending into said cutting chamber and having a polygonal shaped end, and cutting mechanism having a polygonal shaped aperture to receive said end whereby said cutting mechanism is removable through said second opening without interfering with said conveyers.

14. In a device of the character described, the combination of a casing having feed channels intercommunicating at their rear ends, one of said feed channels terminating in a cutting chamber having an opening in its side wall leading to the other feed channel, the feed channel communicating with said cutting chamber having a closed wall in proximity to said chamber provided with spirally disposed channels, feeding means in each of said channels, cutting mechanism in said cutting chamber actuated by one of said feeding means, and driving mechanism for said feeding means.

CHARLES W. HOTTMANN.

Witnesses:
H. S. FAIRBANKS,
C. D. McVAY.

Copies of this patent may be obtained for five cents each, by addressing the "Commissioner of Patents, Washington, D. C."